(12) United States Patent
Watanabe et al.

(10) Patent No.: US 6,461,411 B1
(45) Date of Patent: Oct. 8, 2002

(54) METHOD AND MATERIALS FOR PURIFYING HYDRIDE GASES, INERT GASES, AND NON-REACTIVE GASES

(75) Inventors: Tadaharu Watanabe, Superior; Dan Fraenkel, Boulder, both of CO (US)

(73) Assignee: Matheson Tri-Gas, Longmont, CO (US)

( * ) Notice: Subject to any disclaimer, the term of this patent is extended or adjusted under 35 U.S.C. 154(b) by 0 days.

(21) Appl. No.: 09/954,239

(22) Filed: Sep. 17, 2001

Related U.S. Application Data
(60) Provisional application No. 60/251,000, filed on Dec. 4, 2000.

(51) Int. Cl.[7] .............................................. B01D 53/04
(52) U.S. Cl. ............................ 95/116; 95/900; 502/415
(58) Field of Search .......................... 95/116, 900, 136; 96/108; 423/628; 502/355, 415

(56) References Cited

U.S. PATENT DOCUMENTS

| | | | |
|---|---|---|---|
| 4,235,756 A | * 11/1980 | Slaugh | 423/628 |
| 4,617,035 A | 10/1986 | Wakaizumi et al. | 55/389 |
| 4,889,838 A | * 12/1989 | Lewis et al. | 423/342 |
| 5,595,954 A | * 1/1997 | Lee et al. | 95/131 |
| 5,637,547 A | * 6/1997 | Chopin et al. | 423/625 |
| 5,837,634 A | 11/1998 | McLaughlin et al. | 501/127 |
| 5,917,136 A | * 6/1999 | Gaffney et al. | 95/104 |
| 6,059,859 A | 5/2000 | Alvarez, Jr. et al. | 95/117 |
| 6,159,898 A | * 12/2000 | Kanazirev | 427/215 |

FOREIGN PATENT DOCUMENTS

| | | |
|---|---|---|
| JP | 04124001 | 4/1992 |
| JP | 2741541 B2 * | 4/1998 |
| WO | WO 00/20330 | 4/2000 |

OTHER PUBLICATIONS

Takuya Ikeda, et al. "The elemination of $H_2O$ and $SiH_4$ in $AsH_3$," *Journal of Crystal Growth* 124 (1992) 272–277.

Tadaharu Watanabe, et al. "Adsorption of diaborane and hydrogen selenide on porus alumina and silica," *Journal of Materials Science: Materials in Electronics* 9 (1998) 127–132.

* cited by examiner

*Primary Examiner*—David A. Simmons
*Assistant Examiner*—Frank M. Lawrence
(74) *Attorney, Agent, or Firm*—Steven C. Petersen; Sarah S. O'Rourke; Hogan & Hartson, LLP

(57) ABSTRACT

The invention provides an efficient process by which trace impurities are removed from matrix hydride, inert gases and non-reactive gases, thus decreasing the concentration of the trace gases by a factor of 100-to-10,000, and more specifically to part-per-billion (ppb) or part-per-trillion (ppt) levels. Hydride gases such as ammonia, phosphine and arsine, and inert gases such as nitrogen, helium, hydrogen, and argon are purified by removing trace contaminants such as silane ($SiH_4$), hydrogen sulfide ($H_2S$) and germane ($GeH_4$), along with traces of moisture. The gas purifier materials of this invention include thermally activated aluminas from organic sources, thermally activated modified organic alumina materials, and thermally activated modified aluminas from an inorganic source. The thermally activated alumina materials of this invention are activated by heating the alumina material at a temperature between about 200–1000° C. in an inert atmosphere and maintaining the activated material in an inert atmosphere.

17 Claims, 2 Drawing Sheets

METHOD AND MATERIALS FOR PURIFYING HYDRIDE GASES, INERT GASES, AND NON-REACTIVE GASES

RELATED APPLICATIONS

This application claims priority to U.S. Provisional Patent Application Serial No. 60/251,000, filed Dec. 4, 2000, and entitled "Method and Materials for Purifying Hydride Gases, Inert Gases, and Non-Reactive Gases."

FIELD OF THE INVENTION

This invention relates to the field of gas purification, and to the ultra-purification of bulk or matrix gases that are useful in the microelectronics manufacturing industry. More specifically, the invention relates to methods and materials for selectively removing trace hydride impurities and moisture from matrix hydride gases and inert or non-reactive gases.

BACKGROUND OF THE INVENTION

As semiconductors become smaller and the devices using semiconductors become more sophisticated and therefore more demanding of the semiconductors, the perfectness property of semiconductors becomes an issue of great concern. The manufacture of semiconductors involves the use of reactive gases that are composed of various elements. In addition, manufacturing processes such as metal-organic chemical vapor deposition (MOCVD) and other related manufacturing techniques are used in the manufacture of semiconductors. In these processes the purity of the reactive gases plays a large part in determining the quality of the semiconductor product being manufactured, and in particular the electronic quality of the semiconductor product. Consequently, there is an increasing demand in the microelectronics industry for ultra-pure process gases. Thus, the ultra-purification of gases useful in microelectronics processes has experienced extensive technological effort and advances.

Existing methods of purifying gases used in manufacturing microelectronics devices are generally insufficient for meeting the need for ultra-pure gas. While parts-per-billion (ppb) levels of impurities were tolerable at one time, such levels are now regarded in many processes as too high. This technological effort is nourished by improvements in the analytical techniques that are used to detect impurities in gases. Presently, the ability exists to provide impurity detection limits that are in the ppt levels, for example by using Atmospheric Pressure Ion Mass Spectrometry (APIMS).

Group IIIB metals (e.g., gallium (Ga) and indium (In)) and group VB elements (e.g., phosphorus (P), arsenic (As), and nitrogen (N)) are of special importance in the manufacture of semiconductors in that they are constituents of the so-called Group III/V semiconductors. For example, arsine ($AsH_3$), phosphine ($PH_3$) and ammonia ($NH_3$) are used in the manufacture of Group III/V semiconductors such as gallium arsenide (GaAs), indium phosphide (InP) and gallium nitride (GaN), respectively. Traces of foreign elements in these semiconductor materials are harmful, especially if the foreign elements are Group IVB elements (e.g., Si and Ge) and/or Group VIB elements (e.g., S and Se), which adversely contribute an acceptor effect or a donor effect to the semiconductor material. Unfortunately, trace impurities of Group IVB and VIB elements are very common in so called "pure gases". For example, phosphine and arsine may include traces of silane ($SiH_4$), germane ($GeH_4$), hydrogen sulfide ($H_2S$) and hydrogen selenide ($H_2Se$). In addition, trace quantities of oxygen ($O_2$), oxides such as carbon monoxide (CO) and/or carbon dioxide ($CO_2$), and oxides derived from phosphine and arsine (e.g., $HxP_yO_z$, and $HxAs_yO_z$, wherein x, y and z are small integer numbers) have also been detected in "pure gases." Such impurities are also harmful in semiconductor processes.

Impurities in hydride gases used in the production of semiconductor devices, especially hydride-impurities of other elements, may originate from the hydride bulk gas itself, or from materials that are within gas handling and distribution devices such as gas containers, gas cylinders, gas valves and gas regulators, and even from gas lines that interconnect these devices.

U.S. Pat. No. 5,385,689 discloses a method of purifying semiconductor process gases using a scavenging composition that removes water, oxygen and other oxidants and Lewis acids from gas streams such as hydrogen, nitrogen, helium, neon, argon, krypton, and xenon, and Group IVA-VIA hydride gases such as silane ($SiH_4$), germane ($GeH_4$), ammonia ($NH_3$), phosphine ($PH_3$), arsine ($AsH_3$), hydrogen sulfide ($H_2S$), and hydrogen selenide ($H_2Se$). The scavenging composition is formed by the deposition of a Group IA metal (Na, K, Rb, Cs, or mixtures or alloys thereof) onto an inert, macroreticulate polymer support, followed by pyrolysis at an elevated temperature.

Japanese Patent Application No. 4124001A2 describes a method of purifying arsine using an activated alumina gel. Nitrogen gas that has been heated to 110–200° C. is used to activate a granular alumina gel. Unpurified arsine is brought into contact with the alumina gel, and the temperature is raised to remove impurities from the arsine. However, JP 4124001A2 specifically states that the alumina should not be heated to temperatures over 200° C., stating that temperatures over 200° C. will turn the alumina gel into a powder, thereby rendering the alumina incapable of purifying gases.

Nippon Sanso Corporation has developed an alumina catalyst called MN Purificator™ (also called NSC NeoBead, NeoBead or NB) which selectively removes silane from arsine (Japanese Patent No. 2-246533; Takuya, et al., *J. Cryst. Growth*, 124: 272–277 (1992)). The mechanism whereby silane is removed from arsine by the MN Purificator™ as the arsine passes through alumina is proposed to be a chemical reaction as shown in Equation 1.

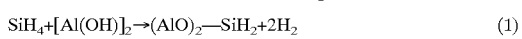

$$SiH_4 + [Al(OH)]_2 \rightarrow (AlO)_2-SiH_2 + 2H_2 \quad (1)$$

Alumina such as the NeoBead material mentioned above is known to remove silane and hydrogen sulfide impurities from inert gas streams such as nitrogen and from the hydride gases arsine and phosphine. However the NeoBead material is ineffective in the elimination of traces of germane impurities from hydride and inert gas streams.

Watanabe, et al. (*Journal of Materials Science: Materials in Electronics*, 9:127–132 (1998)) describe the adsorption of $B_2H_6$ and $H_2Se$ on porous γ-alumina (gamma-alumina) and amorphous silica, and discusses the reactivity of hydrides ($B_2H_6$, $PH_3$, $AsH_3$, and $H_2Se$) to alumina and silica in terms of the basicity of adsorbents and the proton affinity of hydrides.

Ikeda, et al. (*Journal of Crystal Growth*, 124:272–277 (1992)), describe the reduction of the $H_2O$ and $SiH_4$ content of in $AsH_3$ by treating the inner surface of an aluminum cylinder in order to form a clean and smooth oxide layer, and by developing a catalyst that selectively decomposes the $SiH_4$.

A need remains in the art for an effective purifier apparatus and purification method for removing trace impurities from so-called pure gases, specifically the removal of trace hydride impurities from bulk or matrix hydride and non-reactive or inert gases. In particular, there is a need for the selective removal of trace quantities of hydride impurities of Group VB elements such as phosphorus (P) and arsenic (As) and Group IVB elements such as silicon (Si) and germanium (Ge) from hydride gases and non-reactive or inert gases. Such hydride impurities pose environmental and health hazards because of their extreme toxicity, and elimination of these hydrides from bulk and matrix gases is desirable down to the sub-ppm level

SUMMARY OF THE INVENTION

The present invention overcomes the deficiencies of prior art adsorption-based gas purification systems that seek to remove impurities from hydride gases. The invention provides a gas purification system that is especially adapted for, but is not limited to, use in the purification of gases that are thereafter used in the manufacture of semiconductor devices.

Accordingly, this invention provides a method for the selective removal of trace quantities of hydride impurities that may be present in bulk or matrix hydride, inert, and non-reactive gases in parts-per-million (ppm) to parts-per-billion (ppb) levels to provide purified hydride, inert, or non-reactive matrix gases that contain less than about a 1 ppb impurity level of the unwanted hydrides. In particular, this invention provides a method for the selective and effective removal of trace levels of impurities such as germane ($GeH_4$), silane ($SiH_4$), hydrogen sulfide ($H_2S$), carbon dioxide ($CO_2$), siloxanes, phosphorus oxides ($P_xO_y$) and phosphorus oxy-acids ($H_xP_yO_z$), wherein x, y, and z are small integers, from bulk or matrix hydride gases such as ammonia ($NH_3$), phosphine ($PH_3$) and arsine ($AsH_3$) and from inert or non-reactive gases such as nitrogen ($N_2$), hydrogen ($H_2$), argon (Ar), and helium (He). In addition, and concurrently therewith, the method of this invention effectively removes trace quantities of unwanted moisture that may be within such bulk or matrix gases.

More specifically, one embodiment of this invention provides a method for removing trace levels of impurities from hydride, inert, and non-reactive gases by flowing the contaminated gas through an alumina material selected from the group consisting of an organic alumina material, a modified organic alumina material, or a modified inorganic alumina material, wherein the above-described alumina materials are thermally activated prior to use by heating under an inert atmosphere at a temperature between about 200–1000° C. for a sufficient time and maintaining the thermally activated material in an inert atmosphere prior to use. The thermally activated modified organic or modified inorganic alumina materials are prepared by treating an unmodified organic or unmodified inorganic alumina with a modifying agent such as a basic metal salt or metal hydroxide, followed by thermally activating the modified organic or modified inorganic alumina material at a temperature between about 200–1000° C.

This invention further provides alumina-based gas purifier materials for the selective removal of trace amounts of impurities such as germane ($GeH_4$), silane ($SiH_4$), hydrogen sulfide ($H_2S$), carbon dioxide ($CO_2$), siloxanes, phosphorus oxides ($P_xO_y$) and phosphorus oxy-acids ($H_xP_yO_z$), wherein x, y, and z are small integers, and for the removal of trace amounts of moisture from hydride, inert, and non-reactive gases.

This invention further provides a method for preparing modified alumina-based gas purifier materials for the selective removal of trace amounts of impurities and for the removal of moisture from bulk or matrix hydride and inert or non-reactive gases.

Additional novel features and advantages of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

BRIEF DESCRIPTION OF THE FIGURES

The accompanying drawings, which are incorporated herein and form a part of the specification, illustrate preferred embodiments of the present invention, and together with the description, serve to explain the principles of the invention.

In the Figures.

DETAILED DESCRIPTION OF THE INVENTION

Figure 1:
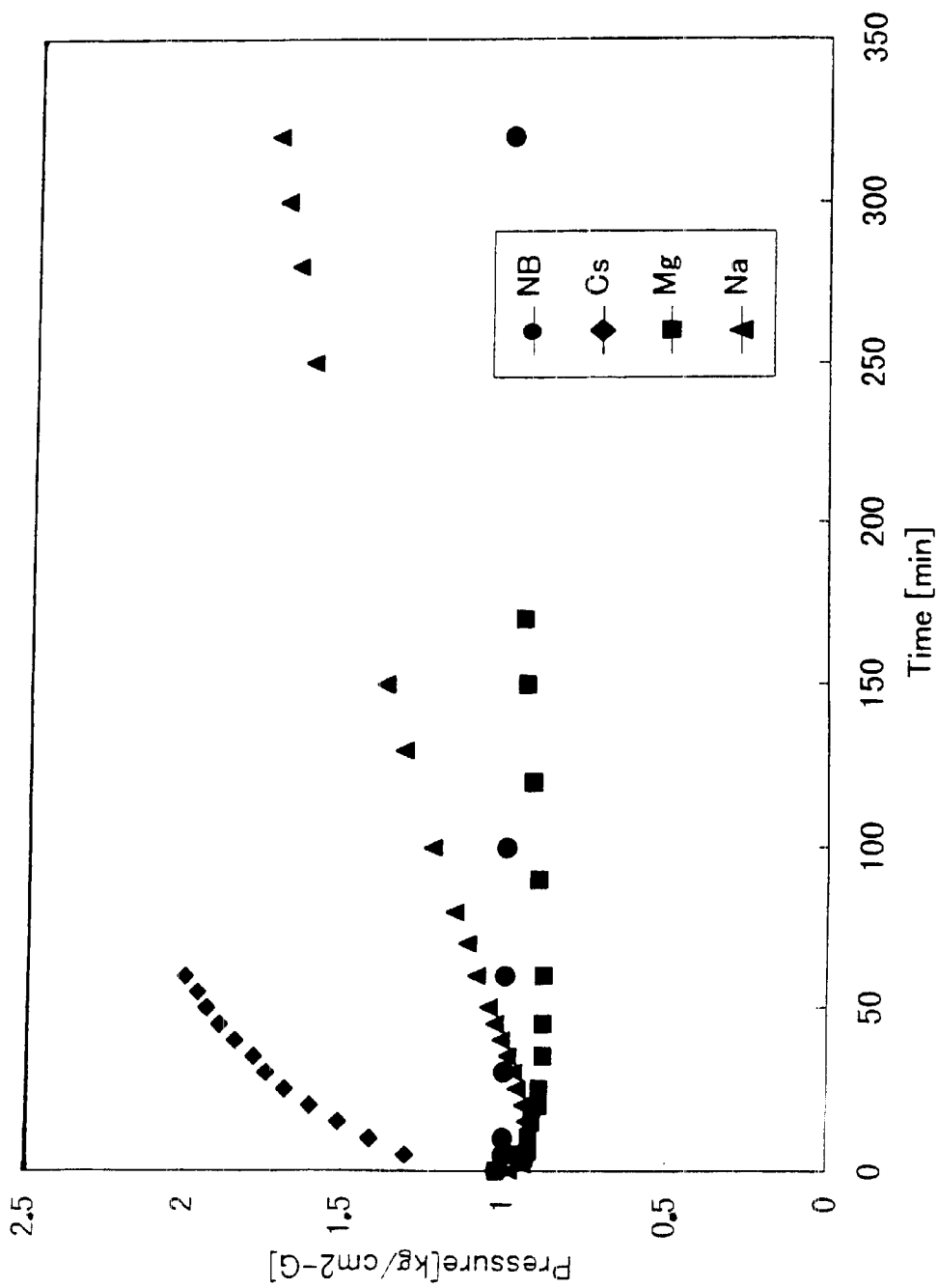
FIG. 1 is a graph plotting hydrogen gas pressure in kilograms/centimeter versus time (minutes) after flowing arsine gas ($AsH_3$) through one of the following gas purifiers: a thermally activated Cs-modified organic alumina ($Cs_2CO_3/Al_2O_3$), a thermally activated Na-modified organic alumina ($NaOH/Al_2O_3$), a commercially available gas purifier material known as NeoBead, and a thermally activated Mg-modified organic alumina ($Mg(OH)_2/Al_2O_3$).

The present invention provides thermally activated alumina-based gas purifier materials that are surprisingly and unexpectedly efficient in selectively reducing trace levels of impurities from hydride, inert, and non-reactive gases. In addition, and concurrently therewith, the purifier materials of this invention remove trace amounts of moisture from the hydride, inert, and non-reactive gases. The invention further provides an efficient process by which trace impurities are removed from bulk or matrix hydride, inert, and non-reactive gases, thus decreasing the concentration of the trace impurities in these gases by a factor of 100 to 10,000, and more specifically to parts-per-billion (ppb) to parts-per-trillion (ppt) levels.

The methods and materials of this invention are especially useful for the effective removal of trace amounts of germane ($GeH_4$), silane ($SiH_4$), hydrogen sulfide ($H_2S$), carbon dioxide ($CO_2$), siloxanes, phosphorus oxides ($P_xO_y$) and phosphorus oxy-acids ($H_xP_yO_z$), wherein x, y, and z are small integers, from hydride gases such as ammonia ($NH_3$), phosphine ($PH_3$) and arsine ($AsH_3$), and from inert or non-reactive gases such as nitrogen ($N_2$), helium (He), argon (Ar) and hydrogen ($H_2$).

Briefly, the purification process comprises contacting the gas to be purified with an alumina-based gas purifier selected from a thermally activated unmodified organic alumina material, a thermally activated modified organic alumina material, or a thermally activated modified inorganic alumina material, wherein the alumina-based gas purifiers were previously activated at a temperature between about 200–1000° C., preferably at a temperature of about 250–600° C., under an inert atmosphere and maintained in an inert atmosphere prior to use. The alumina-based gas purifiers of this invention may be in the form of beads, pellets, extrudates, or other types of particles. The alumina-based gas purifiers are kept within a purifier housing, usually a stainless steel canister, having a gas inlet and a gas outlet that are connected to inlet and outlet gas lines, respectively, by way of suitable gas valves. The gas purification process is typically conducted at temperatures in the range of ambient temperature to about 100° C.

In one embodiment, the purifiers of this invention comprise thermally activated unmodified alumina-based purifiers prepared from unmodified "organic" aluminas. An organic alumina is identified by its low soda ($Na_2O$) content (i.e., less than 0.1%, and more typically around 0.002%). One source of organic alumina is from a process known in the art as the ALFOL™ process, such as that described in U.S. Pat. No. 5,055,019, which is specifically incorporated herein by reference. In this method, aluminum alkoxides are produced as intermediates in the preparation of linear alcohols (i.e., "Alfol" alcohols) by the well-known Ziegler process. These aluminum alkoxides are then further treated to produce aluminum oxides. Examples of commercially available organic alumina include the pseudoboehmite alpha-alumina monohydrate (AlO(OH)) material known commercially as CATAPAL® alumina and PURAL® alumina (CONDEA Vista Company). Typically, these aluminas are composed of about 72% to about 74% $Al_2O_3$, the remainder being essentially hydroxyl groups and moisture. CATAPAL® alumina and PURAL® alumina typically have a soda ($Na_2O$) content of about 0.002%.

Other organic aluminas suitable for preparation of the thermally activated unmodified organic alumina-based purifiers of the present invention are the higher purity alumina materials known as CATALOX® and PURALOX® (CONDEA Vista Company). CATALOX® and PURALOX® are derived from the controlled activation of CATAPALO® and PURAL®, respectively, at a controlled temperature to remove physically and chemically bound water. These organic aluminas are of ultra-high purity (greater than 99.99% $Al_2O_3$) and are essentially free of soda ($Na_2O$), that is, the soda levels are about two orders of magnitude lower than those of inorganic aluminas. The commercially available CONDEA aluminas are heated during manufacturing at 600° C. for 2 hours to remove residual moisture and to change the structure of the alumina to give it its final chemical and physical properties (e.g., surface area, mechanical strength, density, etc.). However, these commercially available CONDEA aluminas are not stored in airtight containers after heating. Consequently, the CONDEA aluminas readsorb water during storage and become inactivated.

Thus, as used herein, the term "organic alumina" refers to any alumina obtained from an organic source, including, but not limited to, aluminum oxides produced during the Ziegler process, pseudoboehmite alpha-alumina monohydrates such as CATAPAL®, PURAL®, CATALOX®, and PURALOX®, and aluminas having a soda ($Na_2O$) content less than about 0.1%.

The physical properties of two batches of organic alumina materials (CONDEA Vista Company) used for preparation of the unmodified organic alumina-based purifiers of this invention are shown below in Table 1 and are compared to NeoBead D and NeoBead GB, which are 90% and 100% organic aluminas, respectively. All alumina materials in Table 1 were in the form of approximately 2.5 nm beads.

TABLE 1

| | PURALOX SCCa-(90-210) (Batch 1) | PURALOX SCCa-(90-210) (Batch 2) | NeoBead D (10% $SiO_2$– 90% $Al_2O_3$) | NeoBead GB (100% $Al_2O_3$) |
|---|---|---|---|---|
| Surface Area (BET), $m^2/g$ | 229 | 211 | 211 | 210 |
| Pore Volume, ml/g | ~0.5 | 0.8 | 0.8 | 0.5 |
| Bulk Density, g/ml | 0.66 | 0.58 | 0.56 | 0.68 |
| Median Diameter, mm | 2.3 | 2.57 | — | — |
| Si | NA | 70 ppm | 9.03 wt % | 46 ppm |
| Fe, ppm | NA | 112 | 9700 | 68 |
| Ti, ppm | NA | 41 | — | 13 |

The preparation of the thermally activated unmodified organic aluminas of this invention is using unmodified organic aluminas such as the CONDEA aluminas is described below in detail.

In an alternate embodiment, the alumina-based gas purifier materials of this invention are prepared by thermally activating modified organic alumina-based purifiers or modified inorganic alumina-based purifiers. The modified organic aluminas and modified inorganic aluminas used to prepare these purifiers are prepared by treating alumina, obtained from either an organic source (such as the organic aluminas described above) or an inorganic source, with a modifying agent. As used herein, the terms "inorganic alumina," "precipitated alumina," and "alumina from an inorganic source" are interchangeable and include pseudo-boebmite alumina obtained from natural alumina sources, such as gibbsite, bayerite or bauxite. Inorganic aluminas from such natural sources are typically about 99% pure and typically have soda ($Na_2O$) contents of about 0.2–0.3%. The term "inorganic alumina" also includes alumina that obtained by rapid mixing of solutions of aluminum compounds, such as by mixing aluminum sulfate and sodium aluminate solutions. This type of inorganic (precipitated) alumina is also contaminated by over 0.01% $Na_2O$.

The modified organic and modified inorganic aluminas of this invention are prepared by treating the organic or inorganic aluminas, described above, with a modifying agent such as a basic salt (e.g., carbonate, oxalate, acetate, etc.) or a basic hydroxide of the Group IA or IIA metals, or combinations thereof. Suitable metal salts and metal hydroxides that may be used to modify an organic or an inorganic alumina according to the methods of this invention include, but are not limited to, hydroxides of Li, Na, K, Rb, Cs, Mg, Ca, Sr, and Ba, carbonates of Li, Na, K, Rb, Cs, Mg, Ca, Sr, and Ba, oxalates of Li, Na, K, Rb, Cs, Mg, Ca, Sr, and Ba, and acetates of Li, Na, K, Rb, Cs, Mg, Ca, Sr, and Ba. Examples of such modifying agents include cesium hydroxide (CsOH), sodium hydroxide (NaOH), magnesium hydroxide ($Mg(OH)_2$), magnesium acetate ($Mg(OAc)_2$, barium hydroxide ($Ba(OH)_2$), and cesium carbonate ($Cs_2CO_3$).

In one embodiment of this invention, the modified aluminas are prepared by applying a modifying agent to the organic or inorganic alumina from a suitable aqueous solution by an impregnation method such as incipient wetness impregnation, followed by drying, to provide a metal-basis concentration of about 1 to 10% on the alumina. By "metal basis," it is meant that the concentration is given as a concentration of the elemental metal (e.g., Mg) as opposed to the concentration of the modifying agent (e.g., Mg(OAc)$_2$). In general, this alumina modifying process increases the basicity of the alumina. Preferably the modified organic and modified inorganic aluminas have a pH that is generally above pH 7.

As stated above, the purifiers of this invention are prepared by thermally activating unmodified organic alumina materials, modified organic alumina materials, or modified inorganic alumina materials. In one embodiment, the above-mentioned alumina materials are thermally activated prior to use by heating an alumina material in a container (such as a stainless steel canister) at an elevated temperature for a sufficient period of time while flowing an inert or non-reactive gas (e.g., nitrogen) through the canister. After heating, the thermally activated alumina material is cooled in the same canister while maintaining the flow of inert gas through the canister. This thermal activation eliminates moisture contained on or within the alumina structure. The thermally activated alumina-based purifiers are maintained in an inert atmosphere within the canister (i.e., are prevented for being contaminated with moisture or other contaminants) prior to and during installation of the canister into a gas purifying system, and therefore maintain their activation levels. Therefore, the term "thermally activated" as used herein to define the purifiers of this invention refers to alumina materials that have been heated in an inert atmosphere at temperatures above 200° C. and have been carefully maintained in an inert atmosphere, thus distinguishing the purifiers of this invention from commercially available aluminas which have not been thermally activated at temperatures above 200° C. and/or aluminas that have been re-exposed to moisture and are therefore inactivated.

Thermal activation of the unmodified organic alumina materials, the modified organic alumina materials, and inorganic alumina materials of this invention is carried out by heating the materials to elevated temperatures in the range of from about 200° C. to about 1000° C., and preferably in the range of about 250° C. to about 600° C., for a period of at least one hour, and more preferably for a period of 2 to 24 hours. The thermal activation may be performed inside a gas purifier canister that contains the alumina material, or in a different container, i.e., either in situ or ex situ.

The ex situ thermal activation applies to larger samples, i.e., at least approximately 1 liter quantities, and is performed with special equipment in which an activation reactor is directly attached through a valve to a container, and the material after activation is transferred for storage to the container under a flow of dry nitrogen gas. The container is then transferred to a transfill line attached to a gas purifier canister. All lines and connecting ports are thoroughly dried by heating and purging with dry nitrogen. The final capping of the filled canister is done in a glove box after detaching the canister from the transfill line. Such a "transfill" mechanism is described in copending U.S. patent application Ser. No. 09/748,734, filed Dec. 26, 2000, which is specifically incorporated herein by reference.

In the case of the modified organic and modified inorganic alumina materials, these materials are thermally activated after modification of the organic or inorganic alumina. In this manner, the thermal activation serves to decompose the modifying agent and to restructure the surface of the modified alumina, as well as to removing residual moisture from the modified alumina. For example, thermal activation of alumina modified by carbonate, oxalate or acetate salts causes partial or complete decomposition of the carbonate, oxalate or acetate anion, to afford the metal oxide (M$_x$O) or metal hydroxide (M(OH)$_x$) on the alumina surface and/or within the pores of the alumina.

The inventors surprisingly and unexpectedly discovered that the thermally activated aluminas of this invention possess a very special efficiencies for the removal of traces of germane (e.g., down to tenths of parts-per-billion levels) from ammonia, phosphine, arsine and inert or non-reactive gases, in addition to the complete removal of any trace quantities of silane, hydrogen sulfide impurities and moisture from those bulk gases, as discussed below in detail.

In order to measure the effectiveness of the thermally activated alumina-based gas purifiers of this invention, four purifiers were tested for their efficiency in removing trace amounts of germane (GeH$_4$) or arsine (AsH$_3$) from inert or non-reactive gases at ambient conditions. The results, summarized in Table 2, show the efficiency of each purifier in removing traces levels of germane (i.e., 240 ppb of GeH$_4$) from helium, and trace levels of arsine (i.e., 100 ppm of AsH$_3$) from nitrogen, using (1) a Mg-modified (Mg(OAc)$_2$) alumina thermally activated at 300° C., (2) a commercially available gas purifier material known as NeoBead MSD-3 thermally activated at 150–200° C., (3) a Na-modified (NaOH) alumina thermally activated at 300° C., and (4) a Cs-modified (Cs$_2$CO$_3$) alumina thermally activated at 300° C. All of the purifier beds contained 70 milliliters of the gas purifier material. The gases were passed over the purifier at 0.1 standard liter per minute (slpm) or at 1 slpm. The results shown in Table 2 indicate the amount (in ppb) of germane or arsine impurity that remained in the a inert gas exiting the purifier material. The percent efficiency of each gas purifier material is shown in parentheses.

TABLE 2

| PURIFIER | IMPURITY CHALLENGE/MATRIX GAS/FLOW RATE | | |
| --- | --- | --- | --- |
| | 240 ppb GeH$_4$ in He, 0.1 liter/min | 240 ppb GeH$_4$ in He, 1.0 liter/min | 100 ppm AsH$_3$ in N$_2$, 0.1 liter/min |
| Mg-modified organic alumina | 10 (95.8%) | — | 19,000 (81%) |
| NeoBead MSD-3 | 8.3 (96.5%) | — | 300 (99.7%) |
| Na-modified organic alumina | <2 (>99%) | 31 ppb (87%) | <10 (>99.99%) |
| Cs-modified organic alumina | <2 (>99%) | <2 ppb (>99%) | <10 (>99.99%) |

As shown in Table 2, the effectiveness of the thermally activated Mg-modified organic alumina and the NeoBead in eliminating germane (GeH$_4$) from helium at a gas flow rate of 0.1 liter/min were similar. The thermally activated Mg-modified alumina reduced the germane impurity level down to 10 ppb, and the NeoBead reduced the germane impurity level down to 8.3 ppb. The thermally activated Na-modified organic alumina and the thermally activated Cs-modified organic alumina were more effective in removing germane than either the thermally activated Mg-modified organic alumina or the NeoBead, in that each reduced the germane level in helium at a flow rate of 1.0 liter/min to below the detection limit (i.e., below 2 ppb). In addition, the thermally activated Na-modified organic alumina and the thermally activated Cs-modified organic alumina exhibited greater than 99% purification efficiency. The thermally activated Na-modified organic alumina was more effective at removing germane at a flow rate of 0.1 liter/min (>99%) than at a flow rate of 1.0 liter/min (87%), while the thermally activated Cs-modified organic alumina was highly effective at removing germane at both a flow rate of 0.1 liter/min and at 1.0 liter/min. The thermally activated Cs-modified organic alumina was superior to the thermally activated Na-modified organic alumina in its ability to eliminate essentially all of the germane challenge (efficiency of greater than 99%), even at a flow rate of 1.0 liter/minute, whereas below the 1.0 liter/minute flow conditions the efficiency of the thermally activated Na-modified organic alumina decreases to 87%.

When the alumina-based gas purifiers of this invention were tested for their efficiencies in removing trace amounts of arsine ($AsH_3$), the thermally activated Na-modified organic alumina and the thermally activated Cs-modified organic alumina were extremely efficient (i.e., greater than 99.99%) at removing arsine from nitrogen at a flow rate of 0.1 liter/min when compared to the thermally activated Mg-modified alumina at the same flow rate. In addition, the thermally activated Na-modified organic alumina and the thermally activated Cs-modified organic alumina were much more efficient in removing trace amounts of arsine from nitrogen than the NeoBead material.

While not wishing to be bound by any theory, the results shown in Table 2 indicate that the ability of a modified organic alumina to remove hydride impurities from the flow of an inert or non-reactive gas may depend on the type of alumina modification. For example, purification effectiveness of the thermally activated modified organic aluminas of this invention increased with an increase in the basicity of the modifying agent, and perhaps an increase in the resultant basicity of the thermally activated modified organic alumina.

Further studies were conducted to show the effects of various thermal activation conditions on the effectiveness of the alumina-based gas purifiers of this invention in removing germane ($GeH_4$) from nitrogen ($N_2$). Table 3 summarizes the results of these studies, using Atmospheric Pressure Ion Mass Spectrometry (APIMS) to monitor impurity levels. Shown is the effect of varying the temperature and/or time during thermal activation of the modified or unmodified alumina on the efficiency of the alumina in removing germane ($GeH_4$) from nitrogen. In these studies, a series of experiments were performed with nitrogen containing between about 25 to about 2500 ppb germane, and the nitrogen was flowed through a variety of purifier materials of this invention (prepared as described in Examples 9–15) that were activated in situ at different temperatures and for different time periods.

Unmodified organic alumina (Table 3, entries 1–6) was found to be effective at activation temperatures above about 250° C., and there was little difference in its effectiveness when the activation temperatures were increased (e.g., between 300° C. and 550° C.), or when the activation time periods were increased (e.g., up to 24 hours). For example, an unmodified organic alumina activated at about 300° C. for about 3 hours (entry 3) decreased 2500 ppb input challenge of germane in the nitrogen gas stream to an output level of 2.5 ppb, while activation of the unmodified organic alumina at about 320° C. for about 24 hours (entry 4) resulted in reducing the output level of the germane impurity to 0.06 ppb. A similar improvement was achieved by activating unmodified organic alumina at higher temperatures for shorter time periods (entries 5 and 6). The Cs-modified organic alumina, i.e., organic alumina modified with cesium hydroxide (entries 7–10) or cesium carbonate (entries 11–13), became effective after activation at about 350° C. As shown in Table 3, there was little difference between an unmodified organic alumina (entries 1–6) and its Cs-modified form, either when modified with a metal hydroxide or metal carbonate (entries 7–13) in its effectiveness of removing trace levels of germane impurities from nitrogen.

In contrast, an unmodified inorganic alumina obtained from LaRoche (entry 18) activated for 7 hours at 550° C. did not effectively remove the germane impurity, even when the germane challenge concentration was as low as 50 ppb. However, the inorganic alumina became a very efficient purifier after modification by $Cs_2CO_3$ (entry 20) or a hydroxide such as CsOH (entry 19) and NaOH (entry 21) after activation at a high temperature such as 550° C. for a time period of 5 hours. The Mg-modified inorganic LaRoche alumina (entry 22), which was activated at 550° C. for 5 hours and the NeoBead material (entry 23), which was activated at 550° C. for 3 hours, were both ineffective in removing germane from nitrogen.

Table 3 shows the dramatic difference in efficiencies between thermally activated unmodified alumina from an organic source and thermally activated unmodified alumina

TABLE 3

| Entry | Material | Activation temp/time | Efficiency for removal of $GeH_4$ from $N_2$ at various challenges (ppb) | | | | | | Moisture emission (ppb) |
|---|---|---|---|---|---|---|---|---|---|
| | | | 25 | 50 | 250 | 500 | 1000 | 2500 | |
| 1 | CONDEA[a] | 110 (24 h) | 25 | | | 67 | 1000 | | ~3 |
| 2 | CONDEA[a] | 220 (3 h) | 5.1 | | | 20 | | ~136 | ~0.5 |
| 3 | CONDEA[a] | 300 (3 h) | 0.48 | 0.062 | | 0.662 | | 2.5 | ~2 |
| 4 | CONDEA[a] | 320 (24 h) | 0.006 | | | 0.01 | | 0.06 | ~0.5 |
| 5 | CONDEA[a] | 380 (3 h) | | | 0.006 | 0.006 | 0.020 | 0.43 | ~1 |
| 6 | CONDEA[a] | 550 (3 h) | | | | 0.004 | 0.024 | 0.86 | ~1 |
| 7 | CsOH/CONDEA[a] | 110 (5 h) | | 5.8 | | | | 2500 | ~13 |
| 8 | CsOH/CONDEA[a] | 350 (5 h) | | | | | | 48 | ~2 |
| 9 | CsOH/CONDEA[a] | 550 (5 h) | | | | | | 0.040 | — |
| 10 | CsOH/CONDEA[a] | 550 (12 h) | | | | 0.020 | | 0.058 | ~1 |
| 11 | $Cs_2CO_3$/CONDEA[a] | 110 (5 h) | | | | | | 130 | ~16 |
| 12 | $Cs_2CO_3$/CONDEA[a] | 350 (5 h) | | | | | | 0.044 | ~1 |
| 13 | $Cs_2CO_3$/CONDEA[a] | 550 (5 h) | | | | | | 0.050 | ~1 |
| 14 | New CONDEA[b] | 550 (3 h) | | | | 0.005 | | 0.108 | ~1 |
| 15 | NaOH/CONDEA[a] | 550 (3 h) | | | | 0.028 | | >7.1 | ~1 |
| 16 | $Mg(OH)_2$/CONDEA[a] | 550 (5 h) | | | | | | 0.058 | ~1 |
| 17 | $Ba(OH)_2$/CONDEA[a] | 550 (5 h) | | | | | | 372[b] | ~1 |
| 18 | LaRoche[c] | 550 (7 h) | | 50 | | | | 2500 | ~1 |
| 19 | CsOH/LaRoche[c] | 550 (5 h) | | | | 0.01 | | 0.108 | ~1 |
| 20 | $Cs_2CO_3$/LaRoche[c] | 550 (5 h) | | | | 0.023 | | 0.107 | ~1 |
| 21 | NaOH/LaRoche[c] | 550 (5 h) | | | | 0.009 | | >1.4[c] | ~1 |
| 22 | $Mg(OH)_2$/LaRoche[c] | 550 (5 h) | | | | | | 2500 | ~1 |
| 23 | NeoBead MSD-3 | 550 (3 h) | | 33 | | | | 2000[b] | ~1 |

[a]PURALOX SCCa-(90-210) organic alumina, batch 1
[b]PURALOX SCCa-(90-210) organic alumina, batch 2
[c]inorganic alumina grade A201 from an inorganic source. For example, the unmodified organic alumina that was activated 550° C. for 3 hours (entry 6) was extremely efficient at removing trace levels of germane impurities, while the unmodified inorganic alumina, even after an activation at 550° C. for 7 hours (entry 18), was completely ineffective in removing trace levels of germane impurities from nitrogen.

The data presented in Table 3 also demonstrates that modification of both organic alumina and inorganic alumina with metal carbonates or metal hydroxides prior to thermal activation according to the method of this invention improves the ability of the modified alumina to eliminate germane impurities in gases. This improvement is especially pronounced for inorganic alumina that in its unmodified state, even after thermal activation, is inefficient in removing germane.

All of the gas purifiers shown in Table 3 were found to be effective in completely removing trace impurities of silane and hydrogen sulfide traces from the phosphine gas stream (data not shown). Therefore, in addition to being effective in completely removing trace impurities of silane and hydrogen sulfide traces from gases, the thermally activated organic alumina-based gas purifiers of this invention possess an advantage over unmodified alumina from inorganic sources (i.e., "precipitated" alumina) in the extra ability to effectively remove trace levels of germane impurities from gas streams.

Table 4 shows the effectiveness of thermally activated unmodified organic alumina and thermally activated modified organic alumina materials of this invention in removing germane, silane, and moisture impurities from phosphine ($PH_3$), ammonia ($NH_3$) and arsine ($AsH_3$). All experiments were done at 20° C. Efficiencies are given as ppb impurity remaining in the gas exiting the purifier. Capacities are given as point of breakthrough in FT-IR measurement and presented as liters of impurity (i.e., germane, silane, sulfur dioxide, or water) per liter of purifier material (up to the breakthrough point).

TABLE 4

| Purifier Material | Matrix gas | Challenge | Efficiency (ppb) | Capacity (L/L) | Instrument |
|---|---|---|---|---|---|
| (1) CONDEA[a] | $PH_3$ | $GeH_4$: 56 ppb, 1 slpm | 1.5 | — | GC/AED |
| | | $SiH_4$: 56 ppb, 1 slpm | <0.3 | — | |
| | | $H_2S$: 60 ppb, 1 slpm | <0.3 | — | |
| (2) $Cs_2CO_3$/ CONDEA[a] | $PH_3$ | $GeH_4$: 200 ppb, 1 slpm | <0.1 | — | GC/AED |
| | | $SiH_4$: 200 ppb, 1 slpm | <0.3 | — | |
| | | $H_2S$: 100 ppb, 1 slpm | <0.3 | — | |
| (3) CsOH/ CONDEA[a] | $PH_3$ | $GeH_4$: 193 ppb, 1 slpm | <0.06 | — | GC/AED |
| | | $SiH_4$: 193 ppb, 1 slpm | <0.08 | — | |
| (4) CONDEA[a] | $NH_3$ | $H_2O$: 430 ppm, 2 slpm (1st) | <150 | 17 (1st) | FT-IR |
| | | $H_2O$: 494, 2 splm (2nd) | <150 | 15 (2nd) | |
| | | Metal emission: $NH_3$ gas | No significant metals were found | | Hydrolysis sampling ICP-MS |
| (5) $Cs_2CO_3$/ CONDEA[a] | $NH_3$ | $GeH_4$: 56 ppb, 1 slpm | <0.5 | — | GC/AED |
| | | $SiH_4$: 56 ppb, 1 slpm | <0.5 | — | GC/AED |
| | | $H_2O$: 778 ppm, 2 slpm (1st) | <100 | 21 (1st) | FT-IR |
| | | $H_2O$: 814 ppm, 2 slpm (2nd) | <100 | 23 (2nd) | |
| | | $H_2O$: 606 ppm, 2 slpm (3rd) | <100 | 21 (3rd) | |
| | | $H_2O$: 680 ppm, 2 slpm (4th) | <100 | 22 (4th) | |
| | | $H_2O$: 798 ppm, 2 slpm (5th) | <100 | 24 (5th) | |
| (6) NeoBead GB[b] | $AsH_3$ | 50 ppb $GeH_4$, 0.5 splm | 9.7 | — | — |
| | | 50 ppb $SiH_4$, 0.5 splm | 1.3 | — | — |
| (7) NeoBead GB[c] | $AsH_3$ | 50 ppb $GeH_4$, 1 splm | <1–2 | — | — |
| | | 50 ppb $SiH_4$, 1 splm | <0.9 | — | — |

[a]PURALOX SCCa-(90-210) organic alumina (batch 1)
[b]Thermally activated at 550° C. for 3 hr; conditioned with $AsH_3$ for 12 hr.
[c]Thermally activated at 550° C. for 3 hr; conditioned with $AsH_3$ for 2 weeks.

The thermally activated Cs-modified aluminas, modified with either $Cs_2CO_3$ (Table 4, entry 2) or CsOH (Table 4, entry 3), were completely effective in removing about 200 ppb germane ($GeH_4$), 200 ppb silane ($SiH_4$) and 100 ppb hydrogen sulfide ($H_2S$) in a phosphine gas stream, i.e., the germane, silane and hydrogen sulfide levels in the output gas were below the detection limit of the GC/AED instrument (see Example 7). The thermally activated unmodified organic alumina (Table 4, entry 1), while effective at removing silane and hydrogen sulfide to levels below the detection limit from phosphine, was not as effective in removing germane as the Cs-modified alumina.

The thermally activated unmodified organic alumina was also effective in removing moisture, germane and silane from ammonia (Table 4, entry 4). For example, 430 ppm $H_2O$, at 2 slpm flow, was reduced to below the detection limit, i.e., 150 ppb (as measured by FT-IR), with a capacity of about 16 liters of water per liter of purifier. The thermally activated Cs-alumina (Table 4, entry 5) removed about 800 ppm moisture, reducing it to below the detection limit of 100 ppb, with a capacity of about 22 liters of water per liter of purifier. The thermally activated Cs-modified organic alumina was also effective in the removal of 56 ppb of both germane and silane in ammonia, to below the detection limit as measured by GC/AED. The five repetitive experiments with the thermally activated $Cs_2CO_3$-modified alumina (Table 4, entry 5) in removing impurities from ammonia demonstrate that the modified organic aluminas of this invention are regenerable for at least a few regeneration cycles, and possibly more.

In addition to effectively removing hydride contaminants from hydride or inert or non-reactive gas, an effective gas purifier must also leave the matrix gas intact, i.e., it must not decompose the matrix hydride gas. For example, in order for a gas purifier of this invention to be a viable purifier of arsine ($AsH_3$), it must be shown that the gas purifier does not decompose the arsine gas during removal of the hydride impurities.

Figure 2:
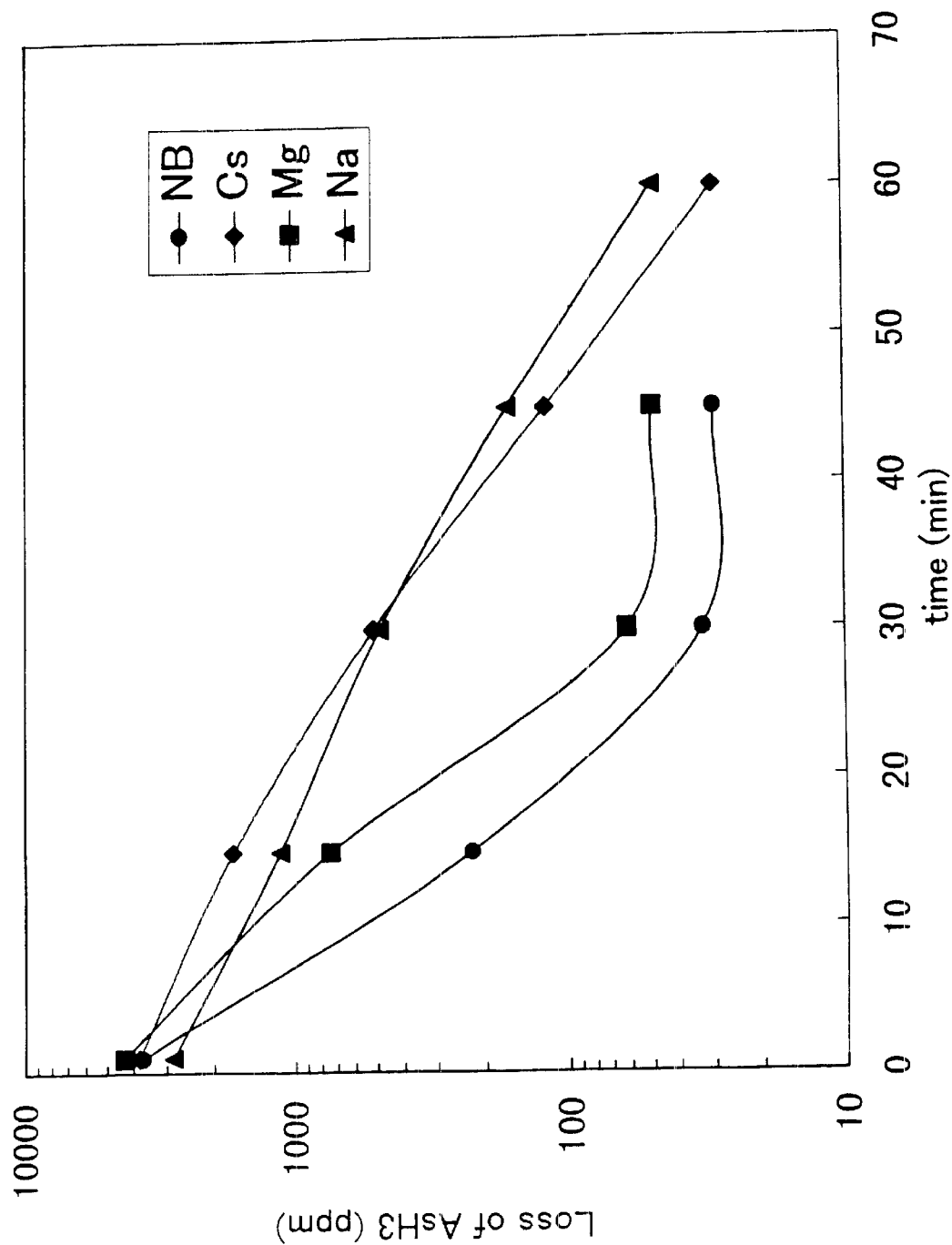
FIG. 2 is a graph plotting the loss of arsine ($AsH_3$) in ppm at the outlet of a canister containing a gas purifier as a function of the time period of gas flow (minutes) through the following gas purifiers: a thermally activated Cs-modified organic alumina ($Cs_2CO_3/Al_2O_3$), a thermally activated Na-modified organic alumina ($NaOH/Al_2O_3$), NeoBead, and a thermally activated Mg-modified alumina organic ($Mg(OH)_2/Al_2O_3$).

FIGS. 1 and 2 summarize the results of a series of experiments that were performed in order to show the stability of arsine when it is purified with each of the following purifier materials: NeoBead MSD-3 (NeoBead), a thermally activated Cs-modified ($Cs_2CO_3$) organic alumina, a thermally activated Mg-modified ($Mg(OAc)_2$) alumina, and a thermally activated Na-modified (NaOH) alumina. In FIG. 1, the four curves representing NeoBead, thermally activated Cs-modified alumina, thermally activated Mg-modified alumina and thermally activated Na-modified alumina show the change in pressure (in $kg/cm^2$) as function of time (in minutes) upon exposure of the gas purifier material to arsine. A pressure increase is indicative of the decomposition of arsine, which decomposition produces hydrogen according to Equation 2.

$$AsH_{3(g)} \rightarrow As_{(s)} 30 \; 3/2H_{2(g)} \qquad (2)$$

FIG. 1 shows the pressure versus time curves for the four purifiers tested. As shown in FIG. 1, the flow of arsine over either a NeoBead (NB) gas purifier (circles) or the thermally activated Mg-modified organic alumina (squares) resulted in almost no pressure change, indicating that the NeoBead and the thermally activated Mg-modified alumina did not decompose arsine according to Equation 2. The thermally activated Na-modified organic alumina (triangles) showed a moderate initial pressure increase with increased time, whereas with the thermally activated Cs-modified organic alumina (diamonds) the initial increase in pressure was quite significant. However, with both the thermally activated Na-modified organic alumina and the thermally activated Cs-modified organic alumina, the rate of arsine decomposition decreased within a short period of time, indicating that the initial arsine decomposition is not significant after the purifier has been on-stream for a few hours. Thus, the decomposition of arsine by thermally activated Cs-modified alumina occurred only initially, perhaps as an alumina 'passivation' process during which arsenic (As) deposits on the alumina surface, either by physical adsorption, or by chemical surface reaction (see Equation 2).

FIG. 2 shows loss of arsine (i.e., the concentration of input arsine minus the concentration of output arsine) as a function of time during the flow of arsine over a NeoBead (NB), a thermally activated Mg-modified organic alumina, a thermally activated Cs-modified organic alumina, or a thermally activated Na-modified organic alumina. In this experiment, 5000 ppm of arsine ($AsH_3$) in helium was flowed through each of the gas purifier materials at 0.1 standard liter per minute (slpm). In all cases there was an initial loss of arsine concentration during the flow of arsine through the purifiers. However, within 30–60 minutes the loss of arsine ceased, indicating that arsine was no longer being decomposed by the gas purifier. For NeoBead (NB) and for thermally activated Mg-modified organic alumina, this recovery was faster, and recovery was complete after about 30 minutes. In the case of the more active and effective modified alumina gas purifiers of this invention, i.e., thermally activated Na-modified organic alumina and thermally activated Cs-modified organic alumina, the outlet arsine concentration was fully restored after a period of about 60 minutes.

FIGS. 1 and 2 illustrate that a gas purifier of this invention that is more effective in the removal of germane causes more initial decomposition of arsine (see also the parenthetical numbers in Table 2 and the efficiency columns in Table 3). However, it can be concluded that the more efficient thermally activated Na-modified alumina and thermally activated Cs-modified alumina can be used effectively for arsine purification after a time period of passivation. Alternatively, thermally activated Mg-modified alumina can be used in the gas purifying methods of this invention, resulting in less initial decomposition of arsine as compared to the unmodified organic alumina, while at the same time preserving the high efficiency of the alumina in the elimination of germane traces (see the corresponding efficiency numbers in Table 3).

It will be recognized that while one embodiment of this invention has been characterized in terms of use with gases for semiconductor and other electronic substrate manufacturing, it will be of similar value with respect to treatment of any hydride gases that are used for deposition of component materials for any other type of high purity product where moisture content is detrimental to the product's production. This could include, for instance, production of high purity substrates or other types of materials for research purposes, production of optical fibers and optoelectronic devices (including lasers) and production of high purity materials that are to be used in extreme environments such as products for use in spacecraft or artificial satallites.

EXAMPLES

Example 1
Preparation of Cs-modified Organic Alumina

Cesium carbonate (10.51 grams; 99% pure; Aldrich Chemical Company) was dissolved in 30 ml of deionized water. The resulting solution was added, drop by drop, during about a 30 minute time period, to 100 grams of organic alumina (PURALOX SCCa-(90-210), batch 1, obtained from CONDEA Vista Company) that had been freshly dried in a vacuum oven at about 105° C. for about 24 hours), using a 250 ml beaker, and in a manner known in the art as incipient wetness impregnation. This was followed by at least about 16 hours of equilibration at room temperature, after which the equilibrated material was transferred to a vacuum oven for drying at about 105° C. for about 20 hours.

Example 2
Thermal Activation of Cs-alumina

Cs-modified alumina (60 ml) of Example 1 was loaded in a stainless steel tube, 2.54 cm in diameter and 30 cm in length. The tube was equipped with an entrance valve on top and an exit valve at the bottom, separated physically from the purifier material by means of a particle filter. Purified nitrogen gas (purified over Nanochemo® OMX) was passed through the filled tube for 15 hours at a flow rate of 1 standard liter per minute (slpm). Then, with the aid of a heat tape, the temperature of the tube was increased to 320° C. and maintained at this point for 24 hours. The material was then cooled to room temperature under the same flow of dry nitrogen, followed by an additional 15 hour period of nitrogen flow through the purifier.

Example 3
Preparation and Thermal Activation of ME-modified Organic Alumina

Modification of organic alumina (PURALOX SCCa-(90-210), batch 1, obtained from CONDEA Vista Company) with magnesium (Mg) was performed as above described in Example 1. Magnesium acetate (13.4 grams; $Mg(OAc)_2$: $4H_2O$); 99% pure; Aldrich Chemical Company) was dissolved in about 30 ml of deionized water. The resulting solution was then added to 100 grams of CONDEA organic alumina, followed by equilibration at room temperature and vacuum oven drying. Thermal activation of the Mg-modified organic alumina was then performed as in above Example 2.

Example 4
Preparation and Thermal Activation of Na-modified Organic Alumina Modification of organic alumina (PURALOX SCCa-90-210, batch 1, obtained from CONDEA Vista Company) with sodium was done according to the above Example 1. Sodium hydroxide (11 grams; 99% pure; Aldrich Chemical Company) was dissolved in about 51 ml of deionized water. The resulting solution was added to 170 grams of the alumina, followed by equilibration period at room temperature, then oven drying at 150° C. The thermal activation of the obtained Na-modified alumina was performed as described in Example 2.

Example 5
Removal of Germane and Arsine Impurities from Inert Gases

Various purifiers were tested for their efficiency in the removal of phosphine and arsine traces in inert gases, at ambient conditions. 240 ppb germane in He and 100 ppm arsine in nitrogen were passed at 0.1 slpm or 1 slpm over 60 ml of a purifier as described in Example 2, 3 and 4, activated at 300° C., and over a NeoBead purifier, for comparison. The analysis of the effluent gas for remaining germane/arsine impurities was done with a GC-PID (Gas Chromatograph with Photo-Ionization Detector). The results are summarized in Table 2.

Example 6
Contacting $AsH_3$ with Various Purifier Materials

The effect of contacting $AsH_3$ with the purifiers of Examples 2, 3 and 4 and NeoBead, was studied as follows. (A) 100% $AsH_3$ was flowed over the purifier at 0.5 slpm for 2 hrs. Then the entrance and exit valves of the purifier canister were closed, leaving the purifier under static contact with the $AsH_3$. Pressure was soon developed as measured by a pressure gauge. The increase in pressure, apparently due to decomposition of arsine to As(s) and $H_2(g)$, according to Equation 2, was followed as a function of time and the results, for the four purifiers, are shown in FIG. 1. (B) After 350 min under $AsH_3$, in the static mode, as described in (A), a flow of 5,000 ppm of $AsH_3$ in He at 0.1 slpm, was conducted through the purifier, and the amount of $AsH_3$ in the effluent gas was monitored occasionally, by GC-PID. The results, as loss of $AsH_3$ in ppm against time, are presented in FIG. 2.

Example 7
Removal of Hydride Impurities from Ammonia

Ammonia gas containing 56 ppb impurity challenge of germane and 56 ppb impurity challenge of silane, was passed over the purifier of Example 2 at a flow rate of about 1 slpm. The purifier was contained in a 60 ml stainless steel canister and a conventional gas system was used for generating and delivering the impurity challenge, with suitable gas lines, valves, fittings, mass flow controllers and flow meters. The analysis of the effluent gas was performed with GC/AED (see Example 8). The concentration of both germane and silane dropped to less then 0.5 ppb, which is the detection limit of the GC/AED.

Example 8
Removal of Hydride Impurities from Phosphine

Measurement of the effectiveness of the removal of trace hydride impurities from phosphine ($PH_3$) was performed using Gas Chromatography/Atomic Emission Detection (GC/AED). See B. D. Quimby and J. J. Sullivan, *Analytical Chemistry* 62:1027–1034 (1990) and J. J. Sullivan and B. D. Quimby, *Analytical Chemistry* 62:1034–1043 (1990), each of which is specifically incorporated herein by reference. In this analysis method, $H_2S$, $SiH_4$ and GeH4 analytes are sequentially separated from $PH_3$ matrix gas (or $SiH_4$ and $GeH_4$ are separated from $AsH_3$ matrix gas) using specific gas chromatography columns and conditions. Once separated from the matrix gas, each separated analyte passes into the atomic emission detector (AED). The AED atomizes each separated analyte in a helium microwave plasma and detects specific emission line(s) for S, Si, and Ge using a grating system and photodiode array detector.

A sixty-milliliter stainless steel canister was used as a purifier housing, and was connected to conventional provisions for gas delivery and impurity challenge generation, and was also connected to suitable gas lines, gas valves, gas fittings, mass flow controllers and flow-meters. A test involving thermally activated $Cs_2CO_3$ modified organic alumina (Example 2) was performed at ambient temperature. The phosphine gas stream contained about 60 ppb germane impurity, and the flow rate of phosphine gas over the thermally activated Cs-modified organic alumina was about 1 liter/minute. The gas chromatographic signal obtained was about 1.3 units.

Without use of the thermally activated Cs-modified organic alumina, the gas chromatographic signal of the gas streams was greater than about 1,900 units. With the thermally activated Cs-modified organic alumina, the output germane level was thus reduced by a factor of about one thousand, to less than 100 ppt (the detection limit), corresponding to a germane removal efficiency of 99.9%. Unmodified organic alumina provided an output signal of 44 units. Hence the organic alumina was also effective in removing the germane challenge, eliminating over 97% of the germane challenge, down to about 1.4 ppb, this being somewhat above the detection limit. In contrast, very large output signals were obtained for a precipitated inorganic alumina (LaRoche) and for an organic alumina (CONDEA Vista Company) modified with sodium hydroxide according to Example 3.

Conditions for this hydride-removal test were then changed for the thermally activated $Cs_2CO_3$-modified organic alumina to further investigate the purifier's efficiency for the removal of germane and other impurities from phosphine. In one test, the impurity challenge was 100 ppb hydrogen sulfide ($H_2S$), 200 ppb silane, and 200 ppb germane. In this test, the hydrogen sulfide and silane were completely eliminated from the phosphine gas stream. An output signal of 1.4 units was found for the germane.

In another test a 60 ppb challenge of germane in phosphine flowed through the thermally activated $Cs_2CO_3$-modified organic alumina at 1.5 liter/min, and an output germane signal of 1.6 units was generated. In comparison, under these conditions the thermally activated unmodified organic alumina gave an output germane signal of 58 units, and was thus significantly less effective.

Conclusions from the above tests were that thermally activated Cs-modified organic alumina as made in Example 1 was extremely efficient for the removal of traces of germane from phosphine. This high efficiency was not affected by a gas flow rate in the range of about 1 to about 1.5 liter/min, or by the existence of other types of impurities such as $H_2S$ and $SiH_4$, both of which impurities were concurrently effectively eliminated to their detection limits.

In another study, the impurity challenge in phosphine was dramatically increased, to 66 ppb $H_2S$ and to 500 ppb $SiH_4$ and 500 ppb $GeH_4$, at a phosphine flow rate of 1.5 liter/min. An analysis of the exit gas having passed through the thermally activated Cs-modified organic alumina was then performed three times. The first analysis provided 0.8 output units of silane (about 150 ppt) and 3.3 output units of germane (about 100 ppt). The second and third analyses gave no output signal for either silane or germane. In all three analyses there was no $H_2S$ signal, meaning that $H_2S$ was entirely removed by the purifier.

The silane/germane ($SiH_4/GeH_4$) challenge was then increased further, to 900 ppb $SiH_4$ and 900 ppb $GeH_4$, at the same phosphine flow rate. In this case the GC/AED method did not detect any $SiH_4/GeH_4$ impurity at the output of the thermally activated Cs-modified organic alumina.

Next, and at a lower phosphine flow rate of 1 liter/minute, the concentrations of both the silane and germane were increased to 1,350 ppb (1.35 ppm). This gas mixture, after passing through the thermally activated Cs-modified organic alumina, again showed no hydride impurity GC signals. Altogether, the purifier operated for over five hours, at a phosphine flow rate of from 1 to 1.5 liter/minute, thus allowing more than 400 liter of phosphine to pass through the thermally activated Cs-modified organic alumina with an average challenge of about 1 ppm, and with a cumulative challenge of about 0.4 ml, corresponding to about 1 milligram silane/germane, but no sign of deterioration and/or loss of performance was detected.

The above experiments illustrate that the thermally activated Cs-modified organic alumina of Example 1 is highly effective and provides a durable purifier for a broad range of impurities in phosphine, even at quite large contaminant concentrations.

Example 9
Preparation of $Mg(OH_2)$-modified Organic Alumina

Modification of an organic alumina (PURALOX SCCa-(90-210), batch 1, obtained from CONDEA Vista Company) with magnesium was performed according to the method of Example 1. Magnesium hydroxide (14 grams; 99% pure; Aldrich) was dissolved in about 100 ml of deionized water, and the obtained solution was added to 200 grams of PURALOX SCCa-90-210 followed by equilibration at room temperature and drying overnight at 150° C.

Example 10
Preparation of Mg-modified Inorganic Alumina

Modification of LaRoche inorganic alumina with magnesium was performed according to the method of Example 1. The LaRoche alumina was alumina grade A201, 93.6% $Al_2O_3$, 0.35% $Na_2O$, 0.02% $SiO_2$, bulk density 0.77 G/mL, 2.44 mm average particle size (beads). Magnesium hydroxide (14 grams; 99% pure; Aldrich) was dissolved in about 100 ml of deionized water, and the obtained solution was added to 200 grams of LaRoche alumina followed by equilibration at room temperature and drying overnight at 150° C.

Example 11
Preparation of $Ba(OH)_2$-modified Organic Alumina

Modification of an organic alumina (PURALOX SCCa-(90-210), batch 1, obtained from CONDEA Vista Company) with barium was performed according to the method of Example 1. Barium hydroxide (27 grams; 99% pure, Aldrich) was dissolved in about 100 ml of deionized water. Some residual $Ba(OH)_2$ remained undissolved. The obtained solution was added to 200 grams of PURALOX SCCa-(90-210) followed by equilibration at room temperature and drying overnight at 150° C.

Example 12
Preparation of CsOH-modified Inorganic Alumina

Modification of LaRoche inorganic alumina (see example 10) with cesium was performed according to the method of Example 1. Cesium hydroxide (22 grams; 99% pure, Aldrich) was dissolved in about 60 ml of deionized water, and the obtained solution was added to 200 grams of LaRoche alumina followed by equilibration at room temperature and drying overnight at 150° C.

Example 13
Preparation of $Cs_2CO_3$-modified Inorganic Alumina

Modification of LaRoche inorganic alumina (see Example 10) with cesium was performed according to the method of Example 1. Cesium carbonate (15 grams; 99% pure; Aldrich) was dissolved in about 60 ml of deionized water, and the obtained solution was added to 200 grams of LaRoche alumina followed by equilibration at room temperature and drying overnight at 150° C.

Example 14
Preparation of NaOH-modified Organic Alumina

Modification of an organic alumina (PURALOX SCCa-(90-210), batch 1, obtained from CONDEA Vista Company) with sodium hydroxide was performed according to the method of Example 1. Sodium hydroxide (13 grams; 99% pure; Aldrich) was dissolved in about 100 ml of deionized water, and the obtained solution was added to 200 grams of PURALOX SCCa-(90-210) followed by equilibration at room temperature and drying overnight at 150° C.

Example 15
Thermal Activation of the Sample Made as Described in Examples 9–14

The thermal activation of the materials made according to Example 9–14 was done as described in Example 2, except that the activation temperature varied between 110° C. and 550° C., and the activation period varied from 3 hours to 24 hours (Table 3).

Example 16
Efficiency Test for the Removal of Germane Impurity from Nitrogen

Measurements of the effectiveness of the purifiers in the removal of germane impurities from nitrogen gas were done using an APIMS (Atmospheric Pressure Ion Mass Spectrometer). The gas canister and gas line systems were as those employed in Example 7. A nitrogen gas stream containing from about 25 ppb to about 2500 ppb (2.5 ppm) challenge of germane (m/z=90, m being mass and z being charge) was passed over the purifier at a flow rate of about 2 slpm. The detection limit of the APIMS instrument for germane is 0.08 ppb. The results of this test are summarized in Table 3.

Example 17
Efficiency Test for the Removal of Germans Ans Silane Impurities from Arsine Measurements of the effectiveness of the removal of traces of hydride impurities from arsine as matrix gas, were performed using GC/AED and a gas line as used in Example 7. Arsine gas with a 50 ppb challenge of germane and 50 ppb challenge of silane, was passed at 20° C. over a bed of NeoBead GB-45 alumina purifier. The physical properties and contaminant level of this alumina are presented in Table 1, in which they are compared with those of CONDEA alumina and NeoBead D. The GB alumina was thermally activated at 550° C. for 3 hours before use, then conditioned under 100% AsH$_3$ stream for 12 hours prior to the introduction of the hydride challenge. The detection limit of GC/AED for germane in arsine is 1–2 ppb and for silane in arsine is 1 ppb. The results of this experiment (Table 4, entry) was a reduction of the concentration of germane in the arsine exit gas to 9.7 ppb (efficiency of 80%) and reduction of the concentration of silane to 1.3 ppb (97% efficiency). When the temperature of the purifier was raised to 70° C., the efficiency of removing both germane and silane increased to 100% (i.e., the impurity level measured in the exit arsine gas was less than the detection limit for both contaminants). When the AsH$_3$ conditioning was performed for two weeks, the purifier removed both germane and silane to below the detection limits at ambient temperature (Table 4, entry 7).

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims that follow.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

We claim:

1. A method of making an activated gas purifier material, comprising:

providing an alumina material;

heating the alumina material in a container at a temperature in the range of from about 200° C. to about 650° C. while flowing an inert gas through the container to form an activated alumina material;

cooling the activated alumina material in said container while maintaining the flow of inert gas through the container; and storing the activated alumina material in an inert atmosphere in said container.

2. The method of claim 1 wherein said alumina is an organic alumina.

3. The method of claim 1, wherein said alumina material is a modified organic alumina.

4. The method of claim 1, wherein said alumina material is a modified inorganic alumina.

5. The method of claim 3, wherein said modified organic alumina is prepared by treating an organic alumina material with a modifying agent prior to said heating step.

6. The method of claim 5, wherein said modifying agent is applied to said organic alumina by incipient wetness impregnation.

7. The method of claim 5 wherein said modifying agent is an oxide, hydroxide, carbonate, acetate, or oxalate of an element of Group IA or IIA.

8. The method of claim 4, wherein said modified inorganic alumina is prepared by treating an inorganic alumina material with a modifying agent prior to said heating step.

9. The method of claim 8, wherein said modifying agent is applied to said inorganic alumina by incipient wetness impregnation.

10. The method of claim 8 wherein said modifying agent is an oxide, hydroxide, carbonate, acetate, or oxalate of an element of Group IA or IIA.

11. The method of claim 1, wherein said alumina material is heated at a temperature between about 300 to 550° C.

12. The method of claim 1, wherein said activated gas purifier is capable of removing trace impurities from a gas.

13. The method of claim 12, wherein said gas is a hydride gas.

14. The method of claim 13, wherein said hydride gas is ammonia, phosphine, or arsine.

15. The method of claim 12, wherein said gas is an inert or a non-reactive gas.

16. The method of claim 15, wherein said inert or non-reactive gas is nitrogen, helium, argon, or hydrogen.

17. The method of claim 12, wherein said impurities are selected from the group consisting of germane, silane, hydrogen sulfide, carbon dioxide, siloxanes, phosphorus oxides, phosphorus oxyacids, and water.

* * * * *